Patented Aug. 7, 1951

2,563,414

UNITED STATES PATENT OFFICE 2,563,414

MOLDED PHONOGRAPH RECORD CONTAINING VINYL CHLORIDE-VINYL ACETATE COPOLYMER AND A RESINOUS EXTRACT OF PINEWOOD

Clinton Leon Parker, Indianapolis, Ind., assignor to Radio Corporation of America, a corporation of Delaware No Drawing. Application December 30, 1947, Serial No. 794,803

3 Claims. (Cl. 260—27)

This invention relates to improvements in moldable compositions comprising certain synthetic resinous materials with or without filling materials.

More specifically the invention relates to moldable compositions comprising certain vinyl polymers and a resin which may be defined as the gasoline insoluble, aromatic hydrocarbon soluble resinous extract of pinewood having the tradename Vinsol. The preparation of this resin is more particularly described in United States Patent 2,114,393, as being a gasoline-insoluble resin obtained from pinewood by extraction of comminuted pinewood by a coal tar hydrocarbon, removal of the volatile substances from such extract to produce a mixture of solid resins, extracting such solid resin mixture by a volatile paraffin hydrocarbon to remove rosin from said resin mixture, and recovering a paraffin hydrocarbon-insoluble resin substantially free from rosin.

Although the compositions of the present invention have general use as molding compositions they are of particular value in the making of disc sound records.

It has been known that good molding compositions can be made from the various vinyl resins and that these vinyl resins may be modified with various other types of either natural or synthetic resinous materials. Also that various fillers, plasticizers, stabilizers, coloring agents, etc., can be included in these compositions. However, it has not been generally recognized that certain vinyl resins could more advantageously be used for molding phonograph records when the vinyl resin was blended with the above described resinous extract of pinewood.

Especially in the field of making sound records from plastic materials, great difficulty is experienced in providing compounds which will have proper flow characteristics and at the same time produce records which are strong enough, which are sufficiently wear resistant and are resistant to cold flow to be practical.

One object of this invention is to provide moldable compositions comprising any one of several vinyl resins and the gasoline insoluble, aromatic hydrocarbon soluble resinous extract of pinewood which compositions may be used to make shaped articles in general.

Another object of the invention is to provide improved phonograph record molding compositions.

Another object of the invention is to provide molding compositions which will produce articles having excellent flexibility and good wear resistant properties.

Another object of the invention is to provide compositions in which certain vinyl resins are modified with a resin which will impart to the composition improved molding qualities.

Another object of the invention is to provide molding compositions from materials having relatively low cost but excellent physical properties.

Still another object is to provide disc phonograph records made from improved compositions comprising certain vinyl resins and the previously referred to resinous extract of pinewood.

Improved compositions according to the present invention can be made up by mixing together in powder form a vinyl resin from the class consisting of polyvinyl chloride, vinyl chloride-vinyl acetate copolymers, and vinyl chloride-vinylidene chloride copolymers, the referred to resinous extract of pinewood and, preferably, at least a stabilizer such as lead stearate and a wax. These ingredients are mixed together in powder form and then may be compounded in a Banbury type mixer or other mixer having heated rolls. After emerging from the Banbury mixer the material may be rolled into sheet form and later cut into biscuits or blocks suitable for molding preparations. When mixing these compositions it is preferable to maintain them at a temperature not exceeding 275° F. so that decomposition of the vinyl resin does not take place, the mixing being accomplished in as short a time as possible also so that the vinyl resin does not deteriorate. In general it has been found that the vinyl resin content may vary between about 10 percent and about 93 percent while the resinous extract of pinewood content may vary from about 5 percent to about 25 percent by weight of the entire composition. If substantially less than 5 percent resinous extract of pinewood is used, the properties of the vinyl resin are not significantly modified. If substantially more than 25 percent resinous extract of pinewood is included in the compositions, cold flow becomes too high, and the wearing properties of the compound as applied to phonograph records is reduced to an undesirably low value. Also if too high percentages of resinous extract of pinewood are used, the strength of the resultant article will be substantially lower.

Although various vinyl resins have been stated as being operative in the invention it is preferred to use the vinyl chloride-vinyl acetate copolymers. In this copolymer the vinyl acetate may vary from about 2.5 percent to about 15 percent, In the case of vinyl chloride-vinylidene chloride copolymers the percentage of vinylidene chloride may vary from about 5 percent to 10 percent.

Discs made of the improved compositions of the present invention may readily be impressed with sound tracks free of blemishes. Moreover, the discs have the other qualities requisite upon good quality phonograph records such as strength, wear resistance and freedom from warpage.

Illustrative examples of record disc compositions follow:

Example 1

| | Per Cent |
|---|---|
| Vinyl chloride-vinyl acetate copolymers (vinyl chloride 85%—vinyl acetate 15%) | 12.5 |
| Gasoline insoluble aromatic hydrocarbon soluble resinous extract of pinewood | 20.0 |
| Lead stearate | 1.0 |
| Carnauba wax | 1.0 |
| Carbon black | 3.0 |
| Orthonitrodiphenyl | 2.0 |
| Filler | 60.5 |

Example 2

| | Per Cent |
|---|---|
| Vinyl chloride-vinyl acetate copolymers (vinyl chloride 85%—vinyl acetate 15%) | 40 |
| Gasoline insoluble, aromatic hydrocarbon soluble resinous extract of pinewood | 20 |
| Lead stearate | 2 |
| Carnauba wax | 1 |
| Carbon black | 5 |
| Filler | 32 |

Example 3

| | Per Cent |
|---|---|
| Vinyl chloride-vinyl acetate copolymers (vinyl chloride 85%—vinyl acetate 15%) | 86 |
| Gasoline insoluble, aromatic hydrocarbon soluble resinous extract of pinewood | 10 |
| Carbon black | 2 |
| Carnauba wax | 1 |
| Lead stearate | 1 |

Example 4

| | Per Cent |
|---|---|
| Vinyl chloride-vinylidene chloride copolymers (5% to 10% vinyl chloride) | 10 |
| Gasoline insoluble, aromatic hydrocarbon soluble resinous extract of pinewood | 18 |
| Carbon black | 2 |
| Wax | 1 |
| Calcium stearate | 1 |
| Filler | 68 |

In the above examples the lead or calcium stearate is incorporated into the formulation for the dual purpose of lubrication of the product to facilitate removal from the molding press and as a stabilization medium for the vinyl resin. Various other metallic salts may be used as stabilizers for vinyl resins all of which are well known in this art. The amount of stabilizer which is preferred to be used in these compositions is about .5% to 2%. It is not desired to be limited to any particular stabilizer for vinyl resins in the present compositions. These have been fully disclosed in the prior art such as in U. S. Patent 1,932,888 and the thermal stabilizers mentioned therein are applicable to the compositions of the present invention. The wax is included in the compositions in order to provide the necessary wear resistance. This wax may be present in an amount of from about .5 percent to about 3 percent. Various waxes may be used, either natural waxes or synthetic waxes. In addition to the wax mentioned in the above examples there may also be used montan wax, Ceranova wax, microcrystalline hydrocarbon wax preferably having a melting point of about 83° to 85° C., a straight chain hydrocarbon wax having a melting point of about 102° C. having molecular weight of about 20,000, or cetyl acetamide. In general, almost any high melting point wax may be used and the examples are merely typical of a large group.

As a coloring agent carbon black may be used in an amount of from about 1.5 percent to about 5 percent preferably. Other colors may be provided by using compatible dyes.

Although not absolutely necessary in the compositions of the present invention, plasticizers may be added in order to obtain improved moldability. These plasticizers are preferably used in an amount of from 1 percent to 4 percent by weight and may comprise such well known plasticizing agents as tricresyl phosphate, dibutyl phthalate, castor oil, linseed oil, orthonitrodiphenyl and others.

In the compositions of the present invention various fillers may be included in an amount up to about 70 percent if desired. These fillers may include mineral fillers such as limestone, slate, diatomaceous earth and clays all of which are ground to a fine state of subdivision. In addition to or in place of these mineral fillers, cellulosic fibers or wood flour may be employed as part of the filler material.

By selecting different compositions within the range of vinyl resins and percentages specified above it is possible to make molded articles especially phonograph records ranging from the hard brittle type to tough flexible articles which are practically unbreakable. Thus the compositions provide a means of obtaining a wide range of physical properties to meet various requirements.

Compositions prepared according to the present invention have provided an unexpected improvement in those molding properties which are of prime importance in the pressing of phonograph records. Unbreakable records can be made from these compositions without many of the difficulties previously present in the molding of compositions containing vinyl resins alone. For example, in the molding of vinyl chloride-vinyl acetate copolymers it has been most difficult to impress sound tracks free of tiny unfilled spots. This difficulty largely disappears when using compositions made up according to the present invention. It is also possible to use large amounts of filler with the particular vinyl resins disclosed without having compositions too stiff for molding, when the proper amounts of the extract of pinewood resin are included as specified.

There has thus been disclosed new molding compositions and new articles not previously described in the prior art and it is desired to be limited in this invention only as indicated in the following claims.

I claim as my invention:

1. A molded phonograph record consisting essentially of from 12.5 percent to 40 percent of a vinyl resin consisting of a copolymer of vinyl chloride-vinyl acetate having 85 percent polyvinyl chloride, 20 percent of the gasoline insoluble, aromatic hydrocarbon soluble resinous extract of pinewood, 1 to 2 percent of a thermal stabilizer for said vinyl resin, 1 percent of a wax, 3 to 5 percent carbon black and 32 to 60.5 percent of a filler.

2. A molded phonograph record consisting essentially of 86 percent of a vinyl resin consisting of a copolymer of vinyl chloride-vinyl acetate having 85 percent polyvinyl chloride, 10 percent of the gasoline insoluble, aromatic hydrocarbon soluble resinous extract of pinewood, 2 percent carbon black, 1 percent wax and 1 percent of a thermal stabilizer for said vinyl resin.

3. A molded phonograph record consisting essentially of from 10 to 93 percent of a vinyl resin consisting of a copolymer of vinyl chloride-vinyl acetate having from 2.5 percent to 15 percent vinyl acetate, 5 to 25 percent of the gasoline insoluble, aromatic hydrocarbon soluble resinous extract of pinewood, a small amount of a thermal stabilizer for said vinyl resin, 0.5 to 3 percent of a wax, 1.5 to 5 percent carbon black and up to 70 percent of a filler.

C. LEON PARKER.

REFERENCES CITED

The following references are of record in the file of this patent:

UNITED STATES PATENTS

| Number | Name | Date |
|---|---|---|
| 2,114,393 | Lane | Apr. 19, 1938 |
| 2,130,239 | Hunter | Sept. 13, 1938 |
| 2,193,026 | Hall | Mar. 12, 1940 |
| 2,307,091 | Yngve | Jan. 5, 1943 |
| 2,335,986 | Yngve | Dec. 7, 1943 |